US011422926B2

(12) United States Patent
Callahan

(10) Patent No.: US 11,422,926 B2
(45) Date of Patent: Aug. 23, 2022

(54) MANAGING TEST COVERAGE FOR A SOFTWARE APPLICATION

(71) Applicant: Red Hat, Inc., Raleigh, NC (US)

(72) Inventor: Jacob Callahan, Clayton, NC (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/385,306

(22) Filed: Apr. 16, 2019

(65) Prior Publication Data

US 2020/0334132 A1 Oct. 22, 2020

(51) Int. Cl.
*G06F 11/36* (2006.01)
*G06F 16/901* (2019.01)

(52) U.S. Cl.
CPC ...... *G06F 11/3684* (2013.01); *G06F 11/3676* (2013.01); *G06F 11/3688* (2013.01); *G06F 16/9027* (2019.01)

(58) Field of Classification Search
CPC ............ G06F 11/3684; G06F 11/3676; G06F 11/3688; G06F 16/9027
USPC .......................................................... 717/124
See application file for complete search history.

(56) References Cited

U.S. PATENT DOCUMENTS

| 8,365,291 | B1* | 1/2013 | Le | G06F 21/6263 |
| | | | | 726/25 |
| 9,934,134 | B2 | 4/2018 | Cohen et al. | |
| 10,198,347 | B1 | 1/2019 | Dunn et al. | |
| 2011/0088014 | A1* | 4/2011 | Becker | G06F 11/3684 |
| | | | | 717/125 |
| 2011/0197176 | A1* | 8/2011 | Muharsky | G06F 11/3672 |
| | | | | 717/113 |
| 2011/0289488 | A1* | 11/2011 | Ghosh | G06F 11/3684 |
| | | | | 717/131 |
| 2012/0060144 | A1* | 3/2012 | Novak | G06Q 10/06 |
| | | | | 717/105 |
| 2014/0089894 | A1* | 3/2014 | Elshishiny | G06F 8/70 |
| | | | | 717/120 |

(Continued)

FOREIGN PATENT DOCUMENTS

CN 109214171 A 1/2019

OTHER PUBLICATIONS

Sacristan, S., "Points of View to Consider When Switching to Automated Testing," Test Architect, Roache Diagnostics, Feb. 9, 2017, https://dzone.com/articles/approaching-to-needs-for-an-automated-test-platfor.

(Continued)

*Primary Examiner* — Chat C Do
*Assistant Examiner* — Bradford F Wheaton
(74) *Attorney, Agent, or Firm* — Kilpatrick Townsend & Stockton LLP

(57) ABSTRACT

Test coverage for a software application can be managed. For example, one system of the present disclosure can receive a feature set for the software application. The feature set indicates features of the software application and functionality attributed to features. The system can also access test code for testing the software application. The test code is source code defining programmatic tests for testing the software application. The system can then determine test coverage for the feature set by analyzing the test code for references to the features and the functionality associated with the feature set. The system can generate a display output indicating the test coverage for the software application.

17 Claims, 5 Drawing Sheets

(56) References Cited

U.S. PATENT DOCUMENTS

| | | | |
|---|---|---|---|
| 2015/0046286 A1* | 2/2015 | Erb | G06Q 30/0623 |
| | | | 705/26.61 |
| 2017/0168919 A1* | 6/2017 | Eberlein | G06F 11/3664 |
| 2018/0095867 A1* | 4/2018 | Varadarajan | G06F 11/3688 |
| 2018/0322036 A1 | 11/2018 | Alam et al. | |
| 2019/0026217 A1 | 1/2019 | Yim et al. | |
| 2020/0117443 A1* | 4/2020 | Nandakumar | G06F 8/658 |

OTHER PUBLICATIONS

"Software Testing for Continuous Delivery," Atlassian, 2019, https://www.atlassian.com/continuous-deiivery/software-testing.

* cited by examiner

```
1    content_views:
2      methods:
3  [+]    - available_puppet_module_names:
8  [+]    - available_puppet_modules:
14 [+]    - copy:
20 [+]    - create:
33 [+]    - destroy:
38 [+]    - list:
58 [+]    - publish:
66 [+]    - remove:
77 [+]    - remove_from_environment:
83 [+]    - show:
88 [+]    - update:
89   hostgroups:
90     methods:
91 [+]    - clone:
98 [+]    - create:
133 [+]   - destroy:
141 [+]   - list:
181 [+]   - multiple_play_roles:
188 [+]   - play_roles:
195 [+]   - rebuild_config:
205 [+]   - show:
214 [+]   - update:
215  lifecycle_environments:
216    methods:
217 [+]   - create:
228 [+]   - destroy:
235 [+]   - list:
251 [+]   - paths:
257 [+]   - show:
264 [+]   - update:
```

```
@tier2
@skip_if_bug_open('bugzilla', 1378009)
def test_positive_update_cv(self):
    """Update a hostgroup with a new content view :id: 5fa39bc9-c78A-49c5-b580-b973e2d25226

:expectedresults: A hostgroup is updated with expected content view

:CaseLevel: Integration
    """
    content_view = entities.ContentView(organization=self.org).create()
    content_view.publish()
    content_view = content_view.read()
    lce = entities.LifecycleEnvironment(organization=self.org).create()
    promote(content_view.version[0], lce.id)
    hostgroup = entities.Hostgroup(
        content_view=content_view,
        lifecycle_environment=lce,
        location=[self.loc],
        organization=[self.org],
    ).create()
    new_cv = entities.ContentView(organization=self.org).create()
    new_cv.publish()
    new_cv = new_cv.read()
    promote(new_cv.version[0], lce.id)
    hostgroup.content_view = new_cv
    hostgroup.update(['content_view'])
    self.assertEqual(hostgroup.content_view.read().name, new_cv.name)
```

FIG. 3

MANAGING TEST COVERAGE FOR A SOFTWARE APPLICATION

TECHNICAL FIELD

The present disclosure relates generally to software testing. More specifically, but not by way of limitation, this disclosure relates to managing test coverage for a software application.

BACKGROUND

Quality engineers are often tasked with testing software applications created by software developers to ensure that the software applications are bug-free and comply with certain standards. To this end, quality engineers may have test automation software through which they can automatically execute programmatic tests on a target software application that is separate from the test automation software. Typically, the target software application is as a "black box" to the test automation software, such that the test automation software provides test inputs into the target software application via a user interface (e.g., an application programming interface, a command line interface, or a graphical user interface) and obtains the corresponding outputs, without knowing the details of what is happening inside the target software application. The test automation software then compares the outputs from the target software application to expected results to determine whether a test passed or failed.

BRIEF DESCRIPTION OF THE DRAWINGS

FIG. 2 depicts an example of a feature set for a software application according to some aspects.

FIG. 3 depicts an example of test code for a software test according to some aspects.

DETAILED DESCRIPTION

Figure 1:
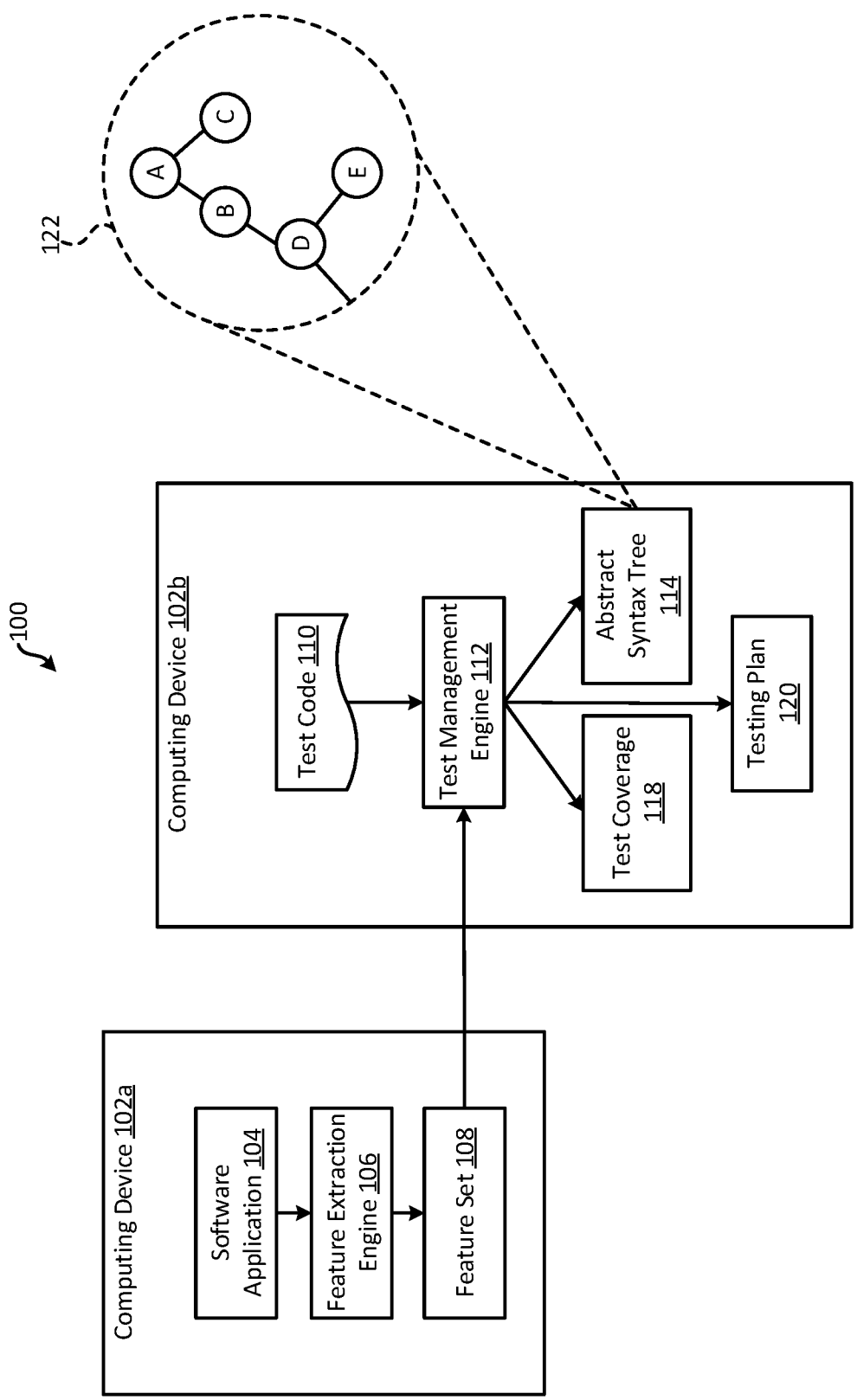
FIG. 1 depicts a block diagram of an example of a system for managing test coverage for a software application according to some aspects.

Quality engineers typically test a target software application by applying hundreds or thousands of programmatic tests to the target software application using test automation frameworks. But these test automation frameworks are designed to be one-size-fits-all in the sense that they are not specifically tailored to any particular type of target software application. This often results in under- or over-testing of the target software application. For example, the testing automation frameworks may lack critical tests for features unique to the target software application, resulting in coverage gaps (absences of testing coverage for particular features or functionality in a target software application). And given the large numbers of programmatic tests and software features, it may be challenging for the quality engineers to identify where these coverage gaps exist, if they even realize that these coverage gaps exist. The testing automation frameworks may also apply superfluous tests or duplicate tests, which wastes valuable time and computing resources.

Some examples of the present disclosure overcome one or more of the abovementioned problems by managing test coverage for a target software application. For example, a system of the present disclosure can autonomously analyze programmatic tests to determine the features and functionality covered by the programmatic tests. The system can then identify coverage gaps in the programmatic tests by mapping the specific features and functionality of a target software application to the features and functionality covered by each of the programmatic tests. The identified coverage gaps can be used to improve test coverage for the target software application. The system may also identify superfluous tests and duplicate tests based on the mapping. This information can be used to eliminate unnecessary tests and avoid test redundancy, thereby improving and expediting the testing process.

As one particular example, the system can receive a feature set for a target software application. A feature set indicates features of a target software application and functionality attributed to the features. One example of a feature can be a class (in the object-oriented programming sense). And one example of functionality can be a procedure (e.g., a function or method) attributed to the class. In some examples, the system can receive the feature set as user input or from a program that can automatically generate the feature set by analyzing the source code for the target software application.

The system can also access test code for testing the target software application. The test code is source code defining one or more programmatic tests for testing the target software application. The test code can be stored in a single file or split up among multiple files. The system can ingest the file(s) to obtain the test code.

After receiving the feature set and the test code, the system can determine test coverage associated with the target software application by analyzing the test code. For example, the system can generate one or more abstract syntax trees from the test code (e.g., a respective abstract syntax tree for each file containing a portion of the test code). An abstract syntax tree is a tree-like representation of the abstract syntactic structure of the test code. In an example in which the test code is in the Python programming language, the system can store the test code from a file as a string and use the "ast.parse" command on the string to generate an abstract syntax tree. The system can traverse through the nodes of the one or more abstract syntax trees in search of references to the features and/or functionality described in the feature set. As one particular example, if the feature set includes the feature "architecture" with the functionality "create," the system can traverse through the nodes in the abstract syntax tree(s) in search of a parent node labeled "architecture" having a child node labeled "create." If the system locates those nodes in the abstract syntax tree(s), the system can mark the "create" functionality for the "architecture" feature as being covered by a programmatic test. If the system is unable to locate one or both of those nodes in the abstract syntax tree(s), the system can note a coverage gap for the "create" functionality for the "architecture" feature. The system can repeat this process for some or all of the features and functionality in the feature set to generate a report indicating which features and functionality are, and are not, covered by the programmatic tests.

Additionally or alternatively, the system can identify references to the same feature and/or functionality while traversing through the abstract syntax tree(s). These references are referred to below as duplicate references. For example, the system can determine that two branches of the abstract syntax tree(s) reference the "architecture" feature and its corresponding "create" functionality. Based on identifying these duplicate references, the system can determine that the programmatic tests corresponding to the duplicate references cover common feature functionality. Such programmatic tests that are at least partially duplicative in their coverage are referred to below as "duplicate tests." The system can generate a report indicating the duplicate tests.

Additionally or alternatively, the system can identify references to superfluous features and/or functionality that is absent from the feature set, while traversing through the abstract syntax tree(s). These references are referred to below as superfluous references. For example, the system can determine that a node references an "editing" feature and its corresponding "open" functionality, which may not be included in the feature set (e.g., because it is not a feature of the target software application). Based on identifying one or both of these superfluous references, the system can determine that the corresponding programmatic test is at least partially superfluous. Such a programmatic test that is at least partially superfluous in its coverage is referred to below as a "superfluous test." The system can generate a report indicating the superfluous tests.

In some examples, the system can automatically generate a testing plan based on the test coverage (e.g., coverage gaps, duplicate tests, superfluous tests, or any combination of these). A testing plan is a plan for testing a target software application. The testing plan can identify one or more programmatic tests to fully execute, one or more programmatic tests to partially execute, one or more programmatic tests to skip, or any combination of these, during a testing process for a software application. The plan may also indicate an order in which the one or more programmatic tests are to be executed.

In some examples, the testing plan is an "optimized testing plan" that yields a maximum amount of test coverage in the fewest number of programmatic tests. For example, the system can determine a subset of the programmatic tests containing the minimum number of programmatic tests required to cover a maximum amount of (e.g., all of) the features and functionality described in the feature set. This subset is referred to below as an "optimal subset." The system may then generate an optimized testing plan that involves executing only the programmatic tests in the optimal subset.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of system 100 for managing test coverage for a software application according to some aspects. The system 100 includes computing devices 102*a-b* in communication with one another. Computing device 102*a* may be associated with a developer of a software application 104, while computing device 102*b* may be associated with a quality engineer charged with testing the software application 104 for any problems (e.g., bugs).

The computing device 102*a* can include a feature extraction engine 106. The feature extraction engine 106 is a software module that is executable by the computing device 102*a* for causing the computing device 102*a* to analyze source code associated with the software application 104 to determine a feature set 108 associated with the software application 104. Alternatively, the feature set 108 can be manually generated by a user (e.g., a developer of the software application 104).

The feature set 108 indicates features of the software application 104 and functionality attributable to the features (e.g., to each of the features). One example of the feature set 108 is depicted in FIG. 2. In the example shown in FIG. 2, the feature set 108 includes the features "content_views," "hostgroups," and "lifecycle_environments." Each feature also has "methods" attributed to the feature. For example, the "content_views" feature has the corresponding methods "available_puppet_module names," "copy," "create," "destroy, "list," etc. While the feature set 108 depicted in example in FIG. 2 is truncated for ease of explanation, other examples may involve feature sets that include hundreds of features, with each feature having dozens of corresponding functionalities.

In some examples, the feature set 108 only specifies differences in feature functionality (functionality for a specific feature) between two versions of a software application 104. More specifically, the differences can indicate feature functionality that is present in one version of the software application 104 and absent from another version of the software application 104. For example, the feature set 108 can result from a "diff" between two versions of the software application 104.

Referring now back to FIG. 1, the computing device 102*a* can transmit the feature set 108 to the computing device 102*b*, which can receive the feature set 108. The computing device 102*b* can also access test code 110 containing source code for one or more programmatic tests usable to test the software application 104. The test code 110 can be stored in one or more files on the computing device 102*b* (or at a remote location and accessed therefrom). One example of the test code 110 is depicted in FIG. 3. While the test code 110 depicted in example in FIG. 3 is truncated for ease of explanation, other examples may involve test code that includes hundreds or thousands of lines of source code collectively forming one or more programmatic tests. The test code 110 depicted in FIG. 3 is further described in greater detail later on in the present disclosure.

The computing device 102*b* can analyze test code 110 in view of the feature set 108 to determine test coverage 118 associated with the software application 104. For example, the computing device 102*b* can generate an abstract syntax tree 114 based on the test code 110. One conceptual diagram of the abstract syntax tree 114 is shown in circle 122, which depicts a series of nodes A-E connected to one another in a tree-like structure. Node A can be referred to as a "parent node" of nodes B and C, which can be referred to as "child nodes" of node A. Node B can also be a parent node of node D, and so forth. The nodes of the abstract syntax tree 114 can correspond to various features and/or functionality covered by the test code 110. The computing device 102*b* can traverse (e.g., recursively parse) through the abstract syntax tree 114 to determine which, if any, parts of the feature set 108 are referenced in the abstract syntax tree 114. A particular example of this process is discussed below with reference to FIGS. 2-3.

Referring now to FIGS. 2-3 together, the computing device 102*b* can receive the test code 110 and first determine that it contains a programmatic test based on the definition name "test_positive_update_cv" including a particular phrase, such as the phrase "test_". The computing device 102*b* can then generate an abstract syntax tree for this particular programmatic test, where the abstract syntax tree has a particular structure of nodes based on the test code 110.

For example, the test code 110 includes the phrase "content_view=entities.ContentView (organization=self.org).create( )". So, the abstract syntax tree will include nodes related to the "ContentView" feature and the "create" functionality. The computing device 102b can search for references to this feature and functionality in the abstract syntax tree, identify the related node(s) in the abstract syntax tree, and accordingly determine that this feature and functionality is covered by the programmatic test. The computing device 102b can also determine that an instance of "ContentView" is being stored in a variable named "content_view" (e.g., based on an assignment node in the abstract syntax tree). So, the computing device 102b can track that variable to look for additional coverage later on.

The test code 110 also includes the line "content_view.publish( )." So, the abstract syntax tree will include nodes related to the "publish" functionality of the "ContentView" feature. The computing device 102b can search for references to this feature and functionality in the abstract syntax tree based on its knowledge of the "content_view" instance, identify the related node(s) in the abstract syntax tree, and accordingly determine that this feature and functionality is covered by the programmatic test.

The test code 110 further includes the line "content_view=content_view.read( )". So, the abstract syntax tree will include nodes related to "read" functionality of the "ContentView" feature. But the "read" functionality is not in the feature set 108, so this is likely extraneous functionality covered by the programmatic test. The computing device 102b may designate it as such.

The test code 110 also includes the line "lce=entities.LifecycleEnvironment(organization=self.org) .create( )." So, the abstract syntax tree will include nodes related to the "LifecycleEnvironment" feature and the "create" functionality. The computing device 102b can search for references to this feature and functionality in the abstract syntax tree, identify the related node(s) in the abstract syntax tree, and accordingly determine that this feature and functionality is covered by the programmatic test. The computing device 102b can also determine that an instance of "LifecycleEnvironment" is being stored in a variable named "lce" (e.g., based on an assignment node in the abstract syntax tree). So, the computing device 102b can track that variable to look for additional coverage later on.

The test code 110 additionally includes the line "promote (content_view. version[0], lce.id)". So, the abstract syntax tree will include a node related to the promote function, which may be an unknown function. The computing device 102b can traverse through a portion of the abstract syntax tree related to the promote function in search of references to features and functionality in the feature set 108. If the computing device 102b identifies any such references, the computing device 102b can note this coverage accordingly. In this way, the computing device 102b can recursively traverse through the test code 110 to determine test coverage.

The test code 110 also involves instantiating another "ContentView" feature and storing it in the variable "new_cv." This will also be reflected in the abstract syntax tree. So, the computing device 102b can search for references to this feature and associated functionality (e.g., create, publish, read, and promote) in the abstract syntax tree. Since the "ContentView feature" and these functionalities were already covered by an earlier part of the abstract syntax tree, the computing device 102b may ignore them.

The test code 110 additionally includes the line "hostgroup.content_view=new_cv." This line involves assigning a known variable ("new_cv") to another known variable's ("hostgroup") attribute ("content_view"). This may be reflected in the abstract syntax tree, for example, via an assignment node. The computing device 102b can identify this assignment in the abstract syntax tree and accordingly track these variables to determine test coverage based on the relationship between them.

The test code 110 further includes the line "self.assertEqual(hostgroup. content_view.read( ).name, new_cv.name)," which involves multiple tracked variables. More specifically, the phrase "hostgroup.content_view.read( )" relates to the "hostgroup" variable's "content_view" attribute, which in turn is a known reference to a ContentView feature from earlier in the test code 110. And in particular this phrase relates to the "read" method associated with the ContentView feature, which was already addressed earlier. So, the computing device 102b can ignore references to these features and functionality while traversing through the abstract syntax tree. This line of the test code 110 also includes the phrase "new_cv.name," which is simply a reference to an attribute (the name) of the "new_cv" variable, as opposed to functionality associated with the "new_cv" variable. So, the computing device 102b can ignore this while traversing through the abstract syntax tree.

At the end of the above process, the computing device 102b has determined that the following features and functionality are covered by the test code 110 depicted in FIG. 3:

ContentView—create
ContentView—publish
ContentView—promote (e.g., from further inspection of the "promote" function)
HostGroup—create
HostGroup—update
LifecycleEnvironment—create The computing device 102b can repeat this process for multiple programmatic tests to determine test coverage 118 (e.g., coverage gaps, duplicate tests, or superfluous tests) associated with the software application 104.

In some examples, the computing device 102b can produce a report indicating the test coverage 118—e.g., indicating any coverage gaps, duplicate tests, or superfluous tests associated with the test code 110. For example, the computing device 102b can generate a report indicating features, functionalities, or both that are not adequately covered by the test code 110.

Additionally or alternatively, the computing device 102b can generate a testing plan 120 based on the test coverage 118. For example, the computing device 102b may determine that the following programmatic tests are duplicative and can be skipped entirely, since their coverage is fully encompassed by the test code 110:

/test_contentview.py::ContentView::test_positive_create
/test_contentview.py::ContentView::test_positive_publish
/test_contentviewversion.py::ContentViewVersion::test_positive_promote
/test_hostgroup.py::HostGroup::test_positive_create
/test_lifecycleenvironment.py::LifecycleEnvironment::test_positive_create So, the computing device 120b can generate a testing plan 120 that excludes these duplicative tests In some examples, the testing plan 120 is an "optimized testing plan" that yields a maximum amount of test coverage for the feature set 108 in the fewest number of programmatic tests. For example, the computing device 102b can rank each of the programmatic tests based on how much of the feature set 108 is covered by that test. The computing device 102b can then step through the programmatic tests, starting with the programmatic tests covering the largest amount of the feature set 108 and working down the list towards the programmatic tests covering the smallest amount of the feature set 108, adding programmatic tests to the testing plan 120 until the entire feature set 108 (all of the feature set 108) is covered by the testing plan 120. The resulting testing plan 120 contains the fewest number of programmatic tests required to yield complete test coverage for the feature set 108.

After generating the testing plan 120, the computing device 120b can execute the testing plan 120 to test the software application 104. For example, the computing device 120b can execute the test plan 120 using testing software (e.g., pytest) to test the software application 104.

While the above examples are provided for illustrative purposes, other configurations and implementations are contemplated within the scope of this disclosure. For example, any of the functionality and components attributed to computing device 102a above may instead be attributed to computing device 102b, and vice-versa. As another example, the computing device 102b can determine the test coverage 118 using a different approach than by generating the abstract syntax tree 114. In one such example, the computing device 102b can parse through the test code 110 (e.g., parse directly through the test code, rather than a tree-like representation of the test code) to identify references to the features and functionality set forth in the feature set 108, thereby determining the test coverage 118.

Figure 4:
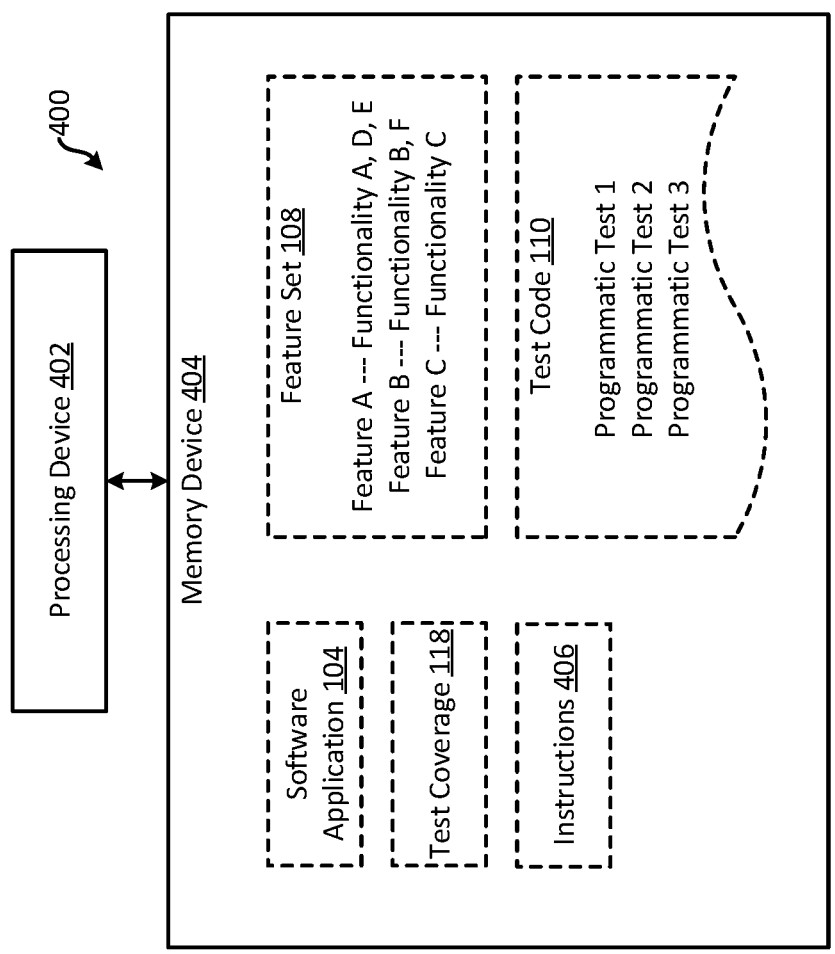
FIG. 4 depicts a block diagram of another example of a system for managing test coverage for a software application according to some aspects.

FIG. 4 depicts a block diagram of another example of a system 400 for managing test coverage for a software application 104 according to some aspects. The components shown in FIG. 4 are exemplary, and other examples can include more components, fewer components, different components, or a different configuration of the components shown in FIG. 4.

The system 400 includes a processing device 402 communicatively coupled with a memory device 404. In some examples, the processing device 402 and the memory device 404 can be part of a computing device, such as computing devices 102. The processing device 402 can include one processing device or multiple processing devices. Non-limiting examples of the processing device 402 include a Field-Programmable Gate Array (FPGA), an application-specific integrated circuit (ASIC), a microprocessor, etc. The processing device 402 can execute instructions 406 stored in the memory device 404 to perform operations. In some examples, the instructions 406 can include processor-specific instructions generated by a compiler or an interpreter from code written in any suitable computer-programming language, such as C, C++, C#, etc.

The memory device 404 can include one memory device or multiple memory devices. The memory device 404 can be non-volatile and may include any type of memory device that retains stored information when powered off. Non-limiting examples of the memory device 404 include electrically erasable and programmable read-only memory (EEPROM), flash memory, or any other type of non-volatile memory. In some examples, at least some of the memory device can include a medium from which the processing device 402 can read instructions 406. A computer-readable medium can include electronic, optical, magnetic, or other storage devices capable of providing the processing device 402 with computer-readable instructions 406 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 405.

In some examples, the processing device 402 receives a feature set 108 for a software application 104. The feature set 108 indicates features of the software application 104 and functionality attributed to the features. In the example shown in FIG. 4, the feature set 108 includes Feature A, Feature B, and Feature C along with corresponding functionality for each of those features. The processing device 402 can also access test code 110 for testing the software application 104. The test code 110 is source code defining programmatic tests for testing the software application 104. In the example shown in FIG. 4, the test code 110 defines Programmatic Test 1, Programmatic Test 2, and Programmatic Test 3.

After receiving the feature set 108 and accessing (e.g., receiving) the test code 110, the processing device 402 determines test coverage 118 for the feature set 108 by analyzing the test code 110 for references to the features and the functionality associated with the feature set 108. For example, the processing device 402 can analyze the test code 110 by parsing through each of the programmatic tests in search of the references. The processing device 402 can then generate a display output indicating the test coverage 118 for the software application 104. For example, the processing device 402 can transmit a display signal to a display device (e.g., a computer monitor, touch-screen display, or television) to generate the display output.

Figure 5:
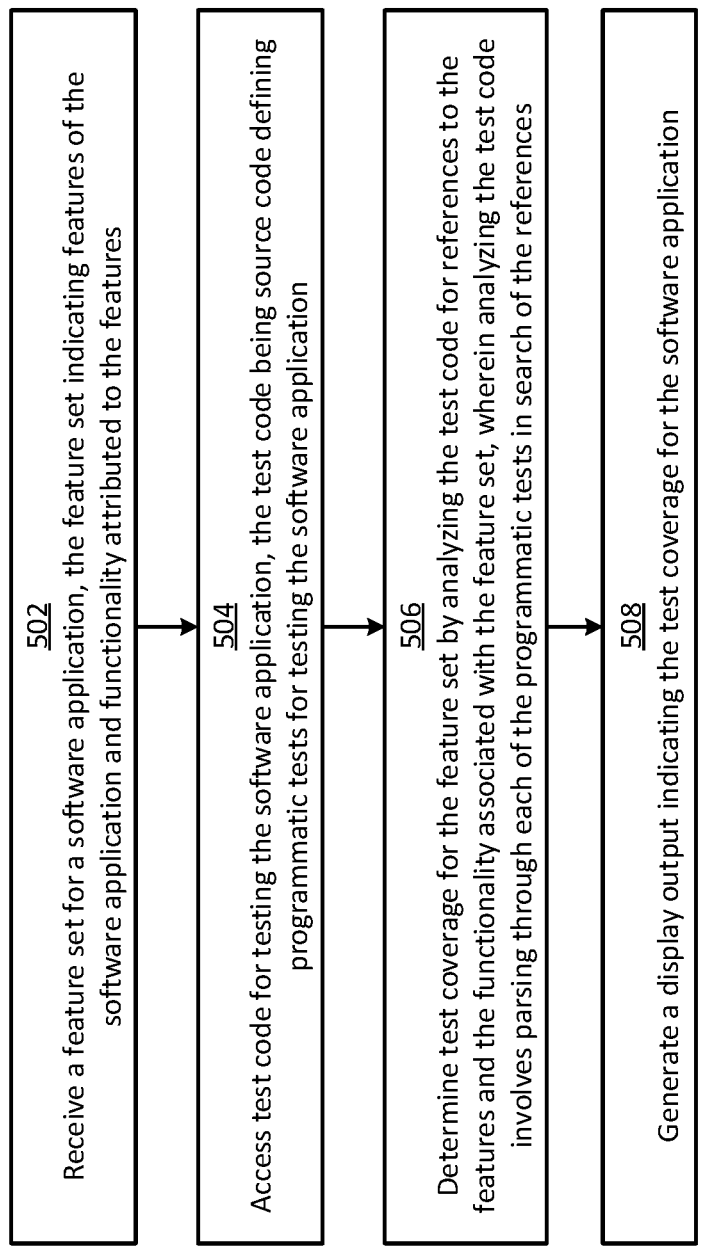
FIG. 5 depicts a flow chart of an example of a process for managing test coverage for a software application according to some aspects.

FIG. 5 depicts a flow chart of an example of a process for managing test coverage for a software application 104 according to some aspects. Other examples can include more steps, fewer steps, different steps, or a different order of the steps than is shown in FIG. 5. The steps of FIG. 5 are discussed below with reference to the components discussed above in relation to FIG. 1.

In block 502, a processing device 402 receives a feature set 108 for a software application 104. The feature set 108 indicates features of the software application 104 and functionality attributed to the features.

In block 504, the processing device 402 accesses test code 110 for testing the software application 104. The test code 110 is source code defining programmatic tests for testing the software application 104.

In block 506, the processing device 402 determines test coverage 118 for the feature set 108 by analyzing the test code 110 for references to the features and the functionality associated with the feature set 108. For example, the processing device 402 can analyze the test code 110 by parsing through each of the programmatic tests in search of the references.

In block 508, the processing device 402 generates a display output indicating the test coverage 118 for the software application 104. For example, the processing device 402 can transmit a display signal to a display device to generate the display output.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processing device; and
a memory device including instructions that are executable by the processing device for causing the processing device to:
receive a feature set for a software application, the feature set indicating relationships between a plurality of features of the software application and a plurality of functionalities, the plurality of functionalities being distinct from the plurality of features, wherein each feature of the plurality of features is related in the feature set to at least two functionalities among the plurality of functionalities;
access test code for testing the software application, the test code being source code defining programmatic tests for testing the software application;
determine a test coverage gap associated with the feature set by analyzing the test code for references to the plurality of features and the plurality of functionalities associated with the feature set, wherein analyzing the test code involves parsing through each of the programmatic tests in search of the references and tracking variable assignments in the programmatic tests, and wherein parsing through each of the programmatic tests involves:
generating an abstract syntax tree from the test code;
traversing nodes of the abstract syntax tree to locate the references to the plurality of features and the plurality of functionalities;
determining that the programmatic tests do not cover first functionality corresponding to a particular feature in the feature set based on an absence of a first reference to the first functionality in the abstract syntax tree, wherein the test coverage gap corresponds to the programmatic tests failing to cover the first functionality; and
determine that the programmatic tests cover second functionality corresponding to the particular feature based on a presence of a second reference to the second functionality in the abstract syntax tree;
determine that at least two tests among the programmatic tests cover common feature functionality by analyzing the test code; and
based on determining that the at least two tests cover the common feature functionality, generate a display output that flags a particular test among the at least two tests as a duplicate test;
determine a testing plan for testing the software application, the test plan including a test configured to resolve the test coverage gap, the testing plan being determined by:
generating a ranked list of programmatic tests by ranking each of the programmatic tests based on how much of the feature set is covered by the programmatic test; and
stepping through the ranked list of programmatic tests, starting with a programmatic test that covers a largest amount of the feature set, and adding other programmatic tests from the ranked list to the testing plan so as to cover the feature set; and
execute the testing plan to test the software application.

2. The system of claim 1, wherein the memory device further includes instructions that are executable by the processing device for causing the processing device to generate another display output indicating that the programmatic tests (i) do not cover the first functionality corresponding to the particular feature, and (ii) do cover the second functionality corresponding to the particular feature.

3. The system of claim 1, wherein the memory device further includes instructions that are executable by the processing device for causing the processing device to:
automatically generate the testing plan based on the test coverage gap.

4. The system of claim 3, wherein the memory device further includes instructions that are executable by the processing device for causing the processing device to:
determine an optimal subset of the programmatic tests configured to cover the entire feature set in a smallest number of programmatic tests; and
include the optimal subset of programmatic tests in the testing plan.

5. The system of claim 1, wherein the feature set only includes differences in feature functionality between two versions of the software application.

6. The system of claim 1, wherein the memory device further includes instructions that are executable by the processing device for causing the processing device to determine the duplicate test by tracking the variable assignments.

7. A method comprising:
receiving, by a processing device, a feature set for a software application, the feature set indicating relationships between a plurality of features of the software application and a plurality of functionalities, the plurality of functionalities being distinct from the plurality of features, wherein each feature of the plurality of features is related in the feature set to at least two functionalities among the plurality of functionalities;
accessing, by the processing device, test code for testing the software application, the test code being source code defining programmatic tests for testing the software application;
determining, by the processing device, a test coverage gap associated with the feature set by analyzing the test code for references to the plurality of features and the plurality of functionalities associated with the feature set, wherein analyzing the test code involves parsing through each of the programmatic tests in search of the references and tracking variable assignments in the programmatic tests, and wherein parsing through each of the programmatic tests involves:
generating an abstract syntax tree from the test code;
traversing nodes of the abstract syntax tree to locate the references to the plurality of features and the plurality of functionalities;
determining that the programmatic tests do not cover first functionality corresponding to a particular feature in the feature set based on an absence of a first reference to the first functionality in the abstract syntax tree, wherein the test coverage gap corresponds to the programmatic tests failing to cover the first functionality; and
determine that the programmatic tests cover second functionality corresponding to the particular feature based on a presence of a second reference to the second functionality in the abstract syntax tree;
determining, by the processing device, that at least one test among the programmatic tests covers a feature or a function that is absent from the feature set;
based on determining that the at least one test covers a feature or a function that is absent from the feature set, generating, by the processing device, a display output that flags the at least one test as a superfluous test;

determining, by the processing device, a testing plan for testing the software application, the test plan including a test configured to resolve the test coverage gap, the testing plan being determined by:

generating a ranked list of programmatic tests by ranking each of the programmatic tests based on how much of the feature set is covered by the programmatic test; and stepping through the ranked list of programmatic tests, starting with a programmatic test that covers a largest amount of the feature set, and adding other programmatic tests from the ranked list to the testing plan so as to cover the feature set; and executing, by the processing device, the testing plan to test the software application.

8. The method of claim 7, further comprising generating another display output indicating that the programmatic tests (i) do not cover the first functionality corresponding to the particular feature, and (ii) do cover the second functionality corresponding to the particular feature.

9. The method of claim 7, further comprising:
automatically generating the testing plan based on the test coverage gap.

10. The method of claim 9, further comprising:
determining an optimal subset of the programmatic tests configured to cover the entire feature set in a smallest number of programmatic tests; and
including the optimal subset of programmatic tests in the testing plan.

11. The method of claim 7, further comprising:
determining that at least two tests among the programmatic tests cover common feature functionality by analyzing the test code; and
generating another display output indicating that a particular test among the at least two tests is a duplicate test based on determining that the at least two tests cover the common feature functionality.

12. The method of claim 11, further comprising determining the duplicate test by tracking the variable assignments.

13. The method of claim 7, wherein the feature set only includes differences in feature functionality between two versions of the software application.

14. A non-transitory computer-readable medium comprising program code that is executable by a processing device for causing the processing device to:
receive a feature set for a software application, the feature set indicating relationships between a plurality of features of the software application and a plurality of functionalities, the plurality of functionalities being distinct from the plurality of features, wherein each feature of the plurality of features is related in the feature set to at least two functionalities among the plurality of functionalities;
access test code for testing the software application, the test code being source code defining programmatic tests for testing the software application;
determine a test coverage gap associated with the feature set by analyzing the test code for references to the plurality of features and the plurality of functionalities associated with the feature set, wherein analyzing the test code involves parsing through each of the programmatic tests in search of the references and tracking variable assignments in the programmatic tests, and wherein parsing through each of the programmatic tests involves:
generating an abstract syntax tree from the test code;
traversing nodes of the abstract syntax tree to locate the references to the plurality of features and the plurality of functionalities;
determining that the programmatic tests do not cover first functionality corresponding to a particular feature in the feature set based on an absence of a first reference to the first functionality in the abstract syntax tree, wherein the test coverage gap corresponds to the programmatic tests failing to cover the first functionality; and
determining that the programmatic tests cover second functionality corresponding to the particular feature based on a presence of a second reference to the second functionality in the abstract syntax tree;
determine that a particular test among the programmatic tests is a duplicative test or a superfluous test;
generate a display output that flags the particular test as the duplicative test or the superfluous test;
determine a testing plan for testing the software application, the test plan including a test configured to resolve the test coverage gap, the testing plan being determined by:
generating a ranked list of programmatic tests by ranking each of the programmatic tests based on how much of the feature set is covered by the programmatic test; and
stepping through the ranked list of programmatic tests, starting with a programmatic test that covers a largest amount of the feature set, and adding programmatic tests from the ranked list to the testing plan so as to cover the feature set; and
execute the testing plan to test the software application.

15. The non-transitory computer-readable medium of claim 14, further comprising program code that is executable by the processing device for causing the processing device to:
automatically generate the testing plan based on the test coverage gap.

16. The non-transitory computer-readable medium of claim 14, further comprising program code that is executable by the processing device for causing the processing device to:
determine that at least one test among the programmatic tests covers a feature or a function that is absent from the feature set; and
based on determining that the at least one test covers a feature or a function that is absent from the feature set, determine that the at least one test is a superfluous test.

17. The non-transitory computer-readable medium of claim 14, further comprising program code that is executable by the processing device for causing the processing device to determine that a particular test among the programmatic tests is a duplicate test by tracking the variable assignments.

* * * * *